US012803039B2

(12) United States Patent
Pozin et al.

(10) Patent No.: US 12,803,039 B2
(45) Date of Patent: Nov. 17, 2026

(54) BATTERY CELL WITH SAFETY LAYER

(71) Applicants: Michael Pozin, Brookfield, CT (US); Walter Fred Paxton, Albuquerque, NM (US); Bryan James Kaehr, Albuquerque, NM (US)

(72) Inventors: Michael Pozin, Brookfield, CT (US); Walter Fred Paxton, Albuquerque, NM (US); Bryan James Kaehr, Albuquerque, NM (US)

(73) Assignees: DURACELL U.S. OPERATIONS, INC., Wilmington, DE (US); NATIONAL TECHNOLOGY & ENGINEERING SOLUTIONS OF SANDIA, LLC, Albuquerque, NM (US)

( * ) Notice: Subject to any disclaimer, the term of this patent is extended or adjusted under 35 U.S.C. 154(b) by 106 days.

(21) Appl. No.: 18/412,979

(22) Filed: Jan. 15, 2024

(65) Prior Publication Data

US 2024/0194929 A1 Jun. 13, 2024

Related U.S. Application Data

(63) Continuation of application No. 17/866,895, filed on Jul. 18, 2022, now Pat. No. 11,876,165, which is a (Continued)

(51) Int. Cl.
*H01M 10/04* (2006.01)
*H01M 50/109* (2021.01)

(Continued)

(52) U.S. Cl.
CPC ..... *H01M 10/0427* (2013.01); *H01M 50/109* (2021.01); *H01M 50/121* (2021.01);

(Continued)

(58) Field of Classification Search
CPC ........... H01M 10/0427; H01M 50/109; H01M 50/121; H01M 50/124; H01M 50/1245; H01M 50/107; H01M 50/103
See application file for complete search history.

(56) References Cited

U.S. PATENT DOCUMENTS 4,473,492 A 9/1984 Schmolka
6,027,326 A 2/2000 Cesarano, III et al.

(Continued)

FOREIGN PATENT DOCUMENTS

CN 104157817 A 11/2014
CN 105470412 A 4/2016

(Continued)

OTHER PUBLICATIONS

Chinese Patent Application No. 201880067218.5, First Office Action, issued Feb. 17, 2022.

(Continued)

*Primary Examiner* — Jimmy Vo
(74) *Attorney, Agent, or Firm* — MARSHALL, GERSTEIN & BORUN LLP

(57) ABSTRACT

A battery cell comprising a composite water-responsive safety layer and/or composite water- and pH-responsive safety layer to protect against tissue damage and/or electrolysis, when the battery cell is exposed to aqueous solution or tissue, is provided. The composite water-responsive safety layer and/or composite water- and pH-responsive safety layer is adapted to change from a non-electronically conducting state to an electronically conducting state.

20 Claims, 8 Drawing Sheets

Related U.S. Application Data continuation of application No. 16/836,745, filed on Mar. 31, 2020, now Pat. No. 11,394,091, which is a continuation of application No. 16/016,466, filed on Jun. 22, 2018, now Pat. No. 10,608,236, which is a continuation-in-part of application No. 15/677,921, filed on Aug. 15, 2017, now Pat. No. 10,637,011.

(51) Int. Cl.
*H01M 50/121* (2021.01)
*H01M 50/124* (2021.01)
*H01M 50/103* (2021.01)
*H01M 50/107* (2021.01)

(52) U.S. Cl.
CPC ..... *H01M 50/124* (2021.01); *H01M 50/1245* (2021.01); *H01M 50/103* (2021.01); *H01M 50/107* (2021.01); *H01M 2200/00* (2013.01)

(56) References Cited

U.S. PATENT DOCUMENTS

| | | | |
|---|---|---|---|
| 6,033,806 | A | 3/2000 | Sugiura et al. |
| 6,383,683 | B1 | 5/2002 | Nagayama et al. |
| 6,401,795 | B1 | 6/2002 | Cesarano, III et al. |
| 8,288,001 | B1 | 10/2012 | Fan et al. |
| 9,130,200 | B2 | 9/2015 | Dipietro et al. |
| 9,741,975 | B2 | 8/2017 | Laulicht et al. |
| 9,865,862 | B2 | 1/2018 | Ok |
| 10,058,881 | B1 | 8/2018 | Keicher et al. |
| 10,593,494 | B2 | 3/2020 | Furuuchi et al. |
| 10,608,236 | B2 | 3/2020 | Pozin et al. |
| 10,637,011 | B2 | 4/2020 | Pozin et al. |
| 10,700,362 | B2 | 6/2020 | Boolish et al. |
| 11,394,091 | B2 | 7/2022 | Pozin et al. |
| 2003/0035994 | A1 | 2/2003 | Zavilenski |
| 2006/0246353 | A1 | 11/2006 | Guo et al. |
| 2007/0099072 | A1 | 5/2007 | Hennige et al. |
| 2011/0229774 | A1 | 9/2011 | Yamaki |
| 2012/0244409 | A1 | 9/2012 | Ok |
| 2012/0321937 | A1 | 12/2012 | Hutzler et al. |
| 2013/0202922 | A1 | 8/2013 | Dipietro et al. |
| 2013/0224572 | A1 | 8/2013 | Cassidy |
| 2014/0170074 | A1 | 6/2014 | Ok |
| 2016/0020436 | A1 | 1/2016 | Laulicht et al. |
| 2016/0129634 | A1 | 5/2016 | Keicher et al. |
| 2016/0365613 | A1 | 12/2016 | Fan |
| 2017/0062829 | A1 | 3/2017 | Ryu et al. |
| 2017/0181291 | A1 | 6/2017 | Bell et al. |
| 2018/0062119 | A1 | 3/2018 | Yagishita et al. |
| 2018/0076467 | A1 | 3/2018 | Boolish et al. |

FOREIGN PATENT DOCUMENTS

| | | | | | |
|---|---|---|---|---|---|
| EP | 2528130 | A1 | | 11/2012 | |
| JP | S57202060 | A | | 12/1982 | |
| JP | 2000048817 | A | | 2/2000 | |
| JP | 2000353505 | A | | 12/2000 | |
| JP | 2007283558 | A | * | 11/2007 | |
| JP | 2012153967 | A | * | 8/2012 | |
| JP | 2017503327 | A | * | 1/2017 | .......... H01M 50/145 |
| JP | 2017073287 | A | | 4/2017 | |
| JP | 2017126405 | A | | 7/2017 | |
| JP | 2017126420 | A | | 7/2017 | |
| JP | 2017126421 | A | * | 7/2017 | |
| JP | 2017126434 | A | | 7/2017 | |
| JP | 2017126435 | A | | 7/2017 | |
| JP | 2017168205 | A | | 9/2017 | |
| JP | 2017168238 | A | | 9/2017 | |
| JP | 2020-532055 | A | | 11/2020 | |
| KR | 20130093183 | A | | 8/2013 | |
| WO | WO-2013/106821 | A1 | | 7/2013 | |
| WO | WO-2014/164098 | A1 | | 10/2014 | |
| WO | WO-2016/179501 | A1 | | 11/2016 | |
| WO | WO-2016/179508 | A2 | | 11/2016 | |
| WO | WO-2017/122250 | A1 | | 7/2017 | |
| WO | WO-2017119033 | A1 | * | 7/2017 | .......... H01M 50/145 |

OTHER PUBLICATIONS

Chinese Patent Application No. 201880067243, Office Action, dated Mar. 14, 2022.

Chinese Patent Application No. 201880072557.2, First Office Action and Search Report, dated Apr. 22, 2022.

Commission of the European Communities, "Council Regulation (EC) No. 440/2008 of May 30, 2008 laying down test methods pursuant to Regulation (EC) No. 1907/2006 of the European Parliament and of the Council on the Registration, Evaluation, Authorisation and Restriction of Chemicals (REACH)," *Official J. European Union* L142, Part. A.6 (p. 57-66), May 31, 2008, (739 pp.).

European Chemicals Agency, "Guidance on information requirements and chemical safety assessment, Chapter R.7a: Endpoint specific guidance," Version 6.0, Helsinki, Finland, Jul. 2017 (610 pp.).

European Chemicals Agency, "Guidance on the biocidal products regulation, Volume I: Identity of the active substance/physico-chemical properties/analytical methodology—Information Requirements, Evaluation and Assessment. Parts A+B+C," Version 2.0, Helsinki, Finland, May 2018 (87 pp.).

Feng Q et al., "Leaching of copper from malachite with methane-sulfonic acid," *Solvent Extraction Research and Development*, Japan 2015;22(2):159-168.

International Search Report and Written Opinion for Application No. PCT/US2018/045441, dated Nov. 19, 2018.

International Search Report and Written Opinion for Application No. PCT/US2018/046581, dated Aug. 14, 2018.

International Search Report and Written Opinion for Application No. PCT/US2018/046581, dated Nov. 19, 2018.

International Union of Pure and Applied Chemistry (IUPAC), "Nomenclature of Inorganic Chemistry," Second edition, Butterworth & Co. (Publishers) Ltd., London, England, 1971 (116 pp.).

Japanese Patent Application No. 2020-508561, Notice of Reasons for Refusal, dated Apr. 26, 2022.

Japanese Patent Application No. 2020-508592, Office Action, dated May 31, 2022.

Laulicht B et al., "Simple battery armor to protect against gastro-intestinal injury from accidental ingestion," *Proceedings of the National Academy of Sciences of the United States of America* 2014;111(46):16490-16495.

Organisation for Economic Cooperation and Development (OECD) Environment Directorate: Joint Meeting of the Chemicals Committee and the Working Party on Chemicals, Pesticides and Biotechnology, "Guidance document on transformation/dissolution of metals and metal compounds in aqueous media," *OECD Series on Testing and Assessment*, No. 29, Jul. 23, 2001 (19 pp.).

Organisation for Economic Cooperation and Development (OECD), "Test No. 105: Water solubility," *OECD Guideline for the Testing of Chemicals*, adopted Jul. 27, 1995 (7 pp.).

Stassi S et al., "Spiky nanostructured metal particles as filler of polymeric composites showing tunable electrical conductivity," *Journal of Polymer Science, Part B: Polymer Physics* 2012;50:984-92.

U.S. Environmental Protection Agency, "Product Properties Test Guidelines—OPPTS 830.7860 Water Solubility (Generator Column Method)," *EPA 712-C-96-042*, Aug. 1996 (19 pp.).

U.S. Environmental Protection Agency, "Product Properties Test Guidelines- OPPTS 830.7840, Water Solubility: Column Elution Method, Shake Flask Method," *EPA 712-C-98-041*, Mar. 1998 (14 pp.).

European Patent Application No. 22200524.1, Extended European Search Report, dated Feb. 27, 2023.

Japanese Patent Application No. 2022-166366, Notice of Reasons for Refusal, dated Jun. 1, 2023.

(56) References Cited

OTHER PUBLICATIONS

Chinese Patent Application No. 202211306592.0, Office Action, mailed Jul. 18, 2026.

* cited by examiner

FIG. 8
522b
3.50E+00
3.00E+00
2.50E+00
2.00E+00
1.50E+00
1.00E+00
5.00E-00
0.00E+00
VOLTAGE (V)
0.00E+00
2.00E+02
4.00E+02
6.00E+02
8.00E+02
1.00E+03
1.20E+03
1.40E+03
TIME/sec

BATTERY CELL WITH SAFETY LAYER

CROSS-REFERENCE TO RELATED APPLICATION

This application is a continuation of U.S. patent application Ser. No. 17/866,895, filed Jul. 18, 2022, which is a continuation of U.S. patent application Ser. No. 16/836,745, filed Mar. 31, 2020, which is continuation of U.S. patent application Ser. No. 16/016,466, filed Jun. 22, 2018, which is a continuation-in-part of U.S. patent application Ser. No. 15/677,921, filed Aug. 15, 2017, which are incorporated herein by reference in their entireties and made a part hereof.

STATEMENT REGARDING FEDERALLY SPONSORED RESEARCH OR DEVELOPMENT

This invention was made under a CRADA (SC03/1672) between the Procter & Gamble Company and Sandia National Laboratories, operated for the United States Department of Energy. The Duracell Company and its subsidiary Duracell U.S. Operations, Inc. are the successors-in-interest to the Procter & Gamble Company under CRADA (SC03/1672). The Government has certain rights in this invention.

FIELD OF THE INVENTION

The present disclosure relates to battery cells and, more particularly, to battery cells with a water-responsive safety layer which can protect against tissue damage and/or electrolysis, when the battery cell is exposed to an aqueous solution or a wet tissue.

BACKGROUND

The background description provided herein is for the purpose of generally presenting the context of the disclosure.

Electrochemical cells, or batteries, are commonly used as electrical energy sources. Small batteries are especially useful in powering consumer products. Small batteries come in a variety of cell types. Common small battery cell types are AAA, AA, B, C, D, 9V, CR2, and CR123A. Other types of small batteries known as button cells (also including wider cells sometimes referred to as coin cells) are frequently used to power a variety of products including but not limited to watches, cameras, calculators, key-less entry systems for vehicles and the like, laser pointers, glucometers, etc. FIG. 1 illustrates the construction of a representative button cell 10 comprising a cathode 12 disposed in a cathode can 14 and an anode 16 disposed within an anode cup 18. A separator 20 physically separates and electronically insulates the anode 16 from the cathode 12. An insulating gasket 22 serves to seal the cell to prevent electrolyte loss and to prevent ingress of ambient atmospheric components into the cell and insulate the cathode can 14 from the anode cup 18. Button cells usually have a long service life, for example, typically well over a year in continuous use in a wristwatch. In addition, most button cells have low self-discharge such that they hold their charge for relatively long times when not placed under load.

While button cell batteries are common in many portable consumer electronic devices, the size, shape, and appearance of these batteries, particularly coin cells having a diameter of 20 mm such as 2016 lithium cells and 2032 lithium cells, can pose swallowing dangers to infants, toddlers, and pets. These dangers can result in bodily harm, especially if the cell is swallowed unbeknownst to others around. And some of these button cell batteries can pose a relatively greater danger than others, which consumers may not fully appreciate. For example, coin cell batteries such as 2016 3V lithium cells and 2032 3V lithium cells, which are based on lithium-manganese dioxide chemistry, are sized such that they readily can become lodged in a human throat and thus cause electrolysis of body fluids and/or burning of esophageal/organ tissue, for example, if swallowed.

SUMMARY OF THE INVENTION

In one aspect, the disclosure provides a battery comprising a housing, the housing comprising first and second poles; and a composite water-responsive safety layer comprising a polymer material and being positioned adjacent to at least one of the first and second poles, the composite water-responsive safety layer being adapted to change from a non-electronically conducting state to an electronically conducting state when contacted with an aqueous solution, the composite water-responsive safety layer further comprising at least one metal salt.

In one refinement of the battery, the at least one metal salt of the composite water-responsive safety layer comprises at least a first metal salt and a second metal salt.

In another aspect, the disclosure provides a method comprising providing a battery housing comprising first and second poles; forming a composite water-responsive safety layer between the first and second poles of the battery housing by depositing a composition between the poles such that the composition is adjacent to at least one of the first and second poles, the composition comprising a polymer material and at least one metal salt, and the composite water-responsive safety layer being adapted to change from a non-electronically conducting state to an electronically conducting state when contacted with an aqueous solution.

In one refinement of the method, the at least one metal salt of the composition comprises at least a first metal salt and a second metal salt.

BRIEF DESCRIPTION OF THE DRAWINGS

While the specification concludes with claims particularly pointing out and distinctly claiming the subject matter, which is regarded as forming the present invention, the invention will be better understood from the following description taken in conjunction with the accompanying drawings. The figures described below depict various aspects of the battery cells disclosed herein. It should be understood that each figure depicts exemplary aspects of the battery cells disclosed herein.

DETAILED DESCRIPTION

Figure 1:
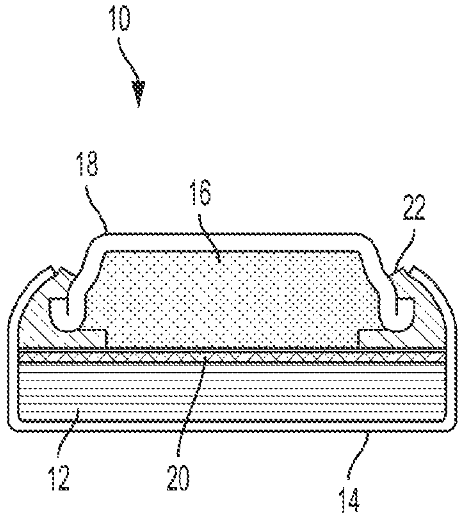
FIG. 1 PRIOR ART
FIG. 1 illustrates a conventional button cell.

Electrochemical cells, or batteries, may be primary or secondary. Primary batteries are meant to be discharged, e.g., to exhaustion, only once and then discarded. Primary batteries are described, for example, in David Linden, Handbook of Batteries (McGraw-Hill, $4^{th}$ ed. 2011). Secondary batteries are intended to be recharged. Secondary batteries may be discharged and then recharged many times, e.g., more than fifty times, more than a hundred times, or more than a thousand times. Secondary batteries are described, e.g., in David Linden, Handbook of Batteries (McGraw-Hill, $4^{th}$ ed. 2011). Batteries may contain aqueous or non-aqueous electrolytes. Accordingly, batteries may include various electrochemical couples and electrolyte combinations. Consumer batteries may be either primary or secondary batteries. However, because of the electrical charges stored in the batteries and because of the exposed poles, it is advantageous to protect consumer batteries, in particular small batteries, against harming consumers when exposed to wet tissues. In particular, it is advantageous to protect batteries against exposing consumers to electrolysis or burns, both of which can occur if a battery is swallowed, for example. If the positive and negative poles of a battery are exposed to wet bodily fluids, electrolysis of water can occur and result in the development of hydroxide ions, so as to cause burning of tissues, particularly those adjacent the negative pole. The present application describes techniques for shorting the batteries in such circumstances thus lowering the cell voltages and effectively preventing tissue damage.

The present disclosure provides a battery cell with a composite water-responsive safety layer comprising a polymer and/or composite water- and pH-responsive safety layer comprising a polymer that incorporate therein safe levels of benign materials capable of creating electrochemically-generated short-circuits when wetted, such as when the composite water-responsive safety layers are exposed to an aqueous solution in the form of saliva, stomach fluids, or other fluid. The resulting short-circuit is able to drop the voltage of the battery cell to below a desired threshold level to thereby reduce and/or effectively prevent the electrolysis of water and the accompanying formation of harmful electrochemically-generated ions (e.g., hydroxide ions). The desired threshold levels can vary, but in some examples detailed herein, the cell can be advantageously shorted to below 1.5V, including below 1.4V, below 1.3V, below 1.2V, below 1.1V, below 1.0V, below 0.9V, below 0.8V, below 0.7V, below 0.6V, below 0.5V, below 0.4V, below 0.3V, below 0.2V, below 0.1V, and even to about 0V. Advantageously, the mere application of the composite water-responsive safety layer and/or composite water- and pH-responsive safety layer does not affect battery cell performance under normal use conditions; thus, for example, the battery has the substantially the same voltage and capacity before and after the composite water-responsive safety layer and/or composite water- and pH-responsive safety layer is provided on the battery. While batteries incorporating a composite water-responsive safety layer and/or composite water- and pH-responsive safety layer are exemplified and described herein using a button cell, more specifically a coin cell, generally any battery type including but not limited to common consumer batteries such as AAAA, AAA, AA, B, C, D, 9V, CR2, CR123A, 1/3N, button cells, and coin cells may be modified to include a composite water-responsive safety and/or composite water- and pH-responsive safety layer according to the disclosure. Generally, shorting the voltage of the battery cell below about 1.2V entirely prevents electrolysis of water, but reducing the voltage below 1.5V will help reduce the amount of electrolysis that would otherwise occur. Thus, in a preferred embodiment, the voltage of the cell is reduced below 1.5V, more preferably below 1.2V, within two hours (or 7200 seconds) as significant burning of esophageal tissues is not found to occur until after two hours.

As used herein, the term "water-responsive" refers to a composite safety layer that does not transition from an electronically non-conducting state to an electronically conducting state when exposed to air. Instead, it is necessary that the composite safety layer absorb a certain amount of moisture before transitioning from an electronically non-conducting state to an electronically conducting state. Thus, the composite water-responsive safety layer itself is hygroscopic. Notably, each of the components included in the composite water-responsive safety layer is typically not hygroscopic; said another way, the composite water-responsive safety layer typically includes hygroscopic components and non-hygroscopic components. As a result, the atmosphere should not cause the composite water-responsive safety layer to transition from an electronically non-conducting state to an electronically conducting state and thus short. However, the composite water-responsive safety layer can short if exposed to high humidity environments for extended periods. For example, cells having composite water-responsive safety layers as described herein preferably can be stored for at least two hours, at least 12 hours, at least 10 days, at least 30 days, and/or at least 60 days in environments having relative humidity values of up to 90% (at temperatures between about 20° C. and about 50° C., for example, at about 30° C., or at about 40° C.). Additionally, cells having composite water-responsive safety layers as described herein preferably can be stored for at least 2 days, at least 10 days, at least 60 days, and/or at least 90 days in environments having relative humidity values of up to 65% (at temperatures between about 20° C. and about 50° C., for example, at about 30° C., or at about 40° C.).

As used herein, the term "water- and pH-responsive" refers to a composite safety layer that does not necessarily transition from an electronically non-conducting state to an electronically conducting state when exposed to water alone. Specifically, a water- and pH-responsive composite safety layer remains in a non-conducting state when in contact with aqueous solutions having a first defined pH range and transitions from the non-conducting state to the conducting state in response to contact with an aqueous fluid having a second, different defined pH range.

In one embodiment, a composite water- and pH-responsive composite safety layer is provided that remains in a non-conducting state in aqueous solutions with acidic or close to neutral pH values, and changes from a non-conducting state to a conducting state in response to contacting the composite water- and pH-responsive safety layer with an aqueous fluid having a pH over 5.0, for example between about 5.0 and about 12.0, between about 5.5 and about 8.0, between about 6.0 and about 7.8, between about 6.2 and about 7.6, between about 8.0 and about 10.0, between about 10.0 and about 12.0, or above 12.0. Thus, the pH of saliva or the pH of body fluids modified as a result of the electrolysis of water can facilitate dendrite growth and accompanying shorting of the cell. As an example, the composite water- and pH-responsive safety layer may comprise a polymer, for example, polyvinyl acetate, a salt such as ammonium carbonate, and a metal powder, for example, copper powder or zinc powder. Contacting the composite water- and pH-responsive safety layer with an alkaline medium such as saliva can cause the ammonium carbonate to form ammonia and carbonate anions and the metal powder can be oxidized to form metal cations capable of being reduced at the battery negative pole such that a dendritic metallic structure can grow within the composite water-responsive safety layer to electronically connect the negative pole to the positive pole under a safety condition, for example, when a person or infant swallows the battery cell.

In another embodiment, a composite water- and pH-responsive safety layer is provided that remains in a non-conducting state in aqueous solutions with neutral or acidic pH, for example below 7.0, and changes from a non-conducting state to a conducting state in response to contacting the composite water-responsive layer with an aqueous fluid having an alkaline pH over 7.0, for example between about 8.0 and about 12.0. As an example, the composite water- and pH-responsive safety layer may comprise a polymer, for example, polyvinyl acetate, a water-soluble salt such as ammonium chloride, and a water-insoluble copper metal salt such as copper carbonate. Contacting the composite water- and pH-responsive safety layer with an alkaline medium such as saliva can cause the ammonium chloride ($NH_4Cl$) to dissolve in the vicinity of and within the safety layer. Hydroxide ions produced at the negative electrode due to electrolysis of water can deprotonate the ammonium ions to form aqueous ammonia ($NH_3$). Aqueous/soluble ammonia can react with the substantially insoluble metal salt copper carbonate to form a soluble complex ion $Cu(NH_3)_4^{2+}$ which is capable of being reduced at the battery negative pole such that a dendritic metallic structure can grow within the composite water- and pH-responsive layer to electronically connect the negative pole to the positive pole under a safety condition, for example, when a person or infant swallows the battery cell.

The composite, water-responsive safety layer and/or composite water- and pH-responsive safety layer comprises a polymer material. Any number of polymers may be used, alone or in combination, to form the composite water-responsive safety layer and/or composite water- and pH-responsive safety layer. In a preferred embodiment, at least one of the polymers in the composite, water-responsive safety layer and/or composite water- and pH-responsive safety layer is a hygroscopic polymer, but the composite water-responsive safety layer and/or composite water- and pH-responsive safety layer may also be rendered hygroscopic by the metal salt included therein. In addition to polyethylene glycols (PEGs), other polymers or combinations thereof can be used to form the layer matrix. Non-limiting examples include but are not limited to polyethylene oxides (PEO), polyacrylic acids (PAA) including but not limited to polymethyl methacrylic acid, polyamides (PA), polyacrylates including but not limited to polymethacrylates such as polymethyl methacrylate, polyvinyl alcohols and modified polyvinyl alcohols, acrylate copolymers, polyvinyl esters including but not limited to polyvinyl acetate, poly(vinyl butyrate), poly(vinyl propionate), and poly(vinyl formate), polyvinyl pyrrolidone, pullulan, gelatin, hydroxylpropylmethyl cellulose (HPMC), low viscosity grade hydroxypropylcellulose, polysaccharides, water-soluble natural polymers including, but not limited to, guar gum, xanthan gum, locust bean gum, carrageenan, and starch, modified starches including, but not limited to, ethoxylated starch and hydroxypropylated starch, copolymers of the foregoing including but not limited to polyvinyl ester copolymers such as poly(ethylene-vinylacetate), and combinations of any of the foregoing. The polymer preferably is a biologically inert material, with no toxicity or little toxicity. The weight average molecular weight of the polymer is not limited but is generally at least 1 kD, for example between 1 kD and 1000 kD, between 5 kD and 750 kD, between 50 kD and 750 kD, for example, about 500 kD.

In embodiments, the composite, water-responsive safety layer and/or composite water- and pH-responsive safety layer comprises a metal salt. The metal salt provides a sacrificial substance capable of being reduced at the battery negative pole such that a dendritic metallic structure can grow within the composite water-responsive film to electronically connect the negative pole to the positive pole under a safety condition, for example, when a person or infant swallows the battery cell, so as to expose the battery cell to an aqueous solution in the form of saliva, stomach fluids, or other fluid, thereby strategically causing the cell to short without significant electrolysis of water and accompanying generation of hydroxide ions and burning of tissues. Suitable metal salts comprising cations including but not limited to transition metal cations such as copper(II) ($Cu^{+2}$), iron(II) ($Fe^{+2}$), mercury(II) ($Hg^{+2}$), nickel(II) ($Ni^{+2}$), silver (I) ($Ag^{+}$), and the like, and other metal cations such as zinc(II) ($Zn^{+2}$), bismuth(III) ($Bi^{+3}$), indium(III) ($In^{+3}$), lead (II) ($Pb^{+2}$), tin(II) ($Sn^{+2}$), as well as combinations thereof may be used. Representative metal salts comprising anions including but not limited to acetate, adipate, alginate, ascorbate, aspartate, benzenesulfonate, benzoate, bicarbonate, bisulfate, bitartrate, borate, bromide, butyrate, camphorate, camphorsulfonate, carbonate, chloride, citrate, cyclopentanepropionate, digluconate, dihydrochloride, diphosphate, dodecylsulfate, edetate, ethanesulfonate, fumarate, glucoheptonate, glucomate, glutamate, glycerophosphate, hemisulfate, heptonate, hexanoate, hydrobromide, hydrochloride, hydroiodide, hydroxide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methylsulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate, and mixtures thereof may be used. Specific metal salts include but are not limited to bismuth carbonate, bismuth chloride, bismuth sulfate, bismuth nitrate, bismuth subsalicylate, bismuth oxide, copper carbonate, copper chloride, copper sulfate, copper oxalate, copper hydroxide, iron carbonate, iron chloride, iron sulfate, indium carbonate, indium chloride, indium sulfate, lead carbonate, lead chloride, lead sulfate, mercury carbonate, mercury chloride, mercury sulfate, nickel carbonate, nickel chloride, nickel sulfate, silver carbonate, silver chloride, silver sulfate, tin carbonate, tin chloride, tin sulfate, zinc carbonate, zinc chloride, zinc sulfate, hydrates thereof, basic salts thereof (hydroxide salts, oxide salts), and combinations thereof. Non-metal salts such as ammonium carbonate ($(NH_4)_2CO_3$) and ammonium chloride ($NH_4Cl$) may also be used in combination with a metal salt. Additionally, other metal salts such as sodium chloride (NaCl) that do not provide a sacrificial substance capable of being reduced at the battery negative pole but can support the transition from an electronically non-conducting state to an electronically conducting state, for example, by serving as a humectant and/or increasing the conductivity of the composite, water-responsive safety layer and/or composite water- and pH-responsive safety layer may be included.

As used herein, the term "copper carbonate" is used to refer to copper(II) carbonate (also known as cupric carbonate and neutral copper carbonate) and basic copper carbonate (also known as basic cupric carbonate, copper carbonate hydroxide, and malachite). Thus, as used herein, the term copper carbonate (without further description) refers to both (neutral) copper(II) carbonate ($CuCO_3$) and basic copper carbonate ($CuCO_3 \cdot Cu(OH)_2$). Typically, the term is used herein to refer to basic copper carbonate, but if not further specified by an indication of neutral or basic, it should be understood that both materials are contemplated.

In one refinement, the at least one metal salt of the composite water-responsive safety layer comprises at least a first metal salt and a second metal salt. When a second metal salt such as copper carbonate that is water-insoluble is present in combination with a water-soluble salt such as copper sulfate, cells advantageously demonstrate no change in cell voltage even after exposure to high relative humidity for extended periods. As used herein, "water-soluble" refers to a solute that has a solubility in water (at about 25° C., about pH 7) of greater than 100 mg/L, greater than 150 mg/L, greater than 200 mg/L, greater than 1000 mg/L, and/or greater than 100 g/L. As an example, copper sulfate has a water solubility at (at about 25° C., about pH 7) of about 220 g/L. On the other hand, "water-insoluble" refers to a solute that has a solubility in water (at about 25° C., about pH 7) of less than 10 mg/L, less than 7.5 mg/L, less than 5 mg/L, less than 2.5 mg/L, and/or less than 1 mg/L. As examples, copper(II) carbonate has a solubility in water (at about 25° C., about pH 7) of about 1.46 mg/L and basic copper carbonate has a solubility in water (at about 25° C., about pH 7) of about 4.68 mg/L. When a combination of water-insoluble and water-soluble salts is used, a difference in magnitude of water solubility between the water-insoluble salt and the water-soluble salt of at least 10 times, at least 100 times, at least 1000 times, and/or at least 10,000 times may be present. For example, copper sulfate is greater than 10,000 times more soluble in water than basic copper carbonate. In another instance, the ratio of water solubility between the water-insoluble salt and the water-soluble salt can be at least about 1:10 (e.g., at least about 1:100, 1:1,000, 1:10,000, or greater).

Water solubility values for many salts can sometimes be found in the literature, but are determined herein using either the "flask method" or the "column elution method". As described in EPA OPPTS 830.7840 (Water Solubility), which is hereby incorporated herein by reference, the column elution is used for substances with low solubilities (solubility less than 10 mg/L) and the flask method is used for substances with higher solubilities (solubility greater than 10 mg/L).

In brief, water solubility is determined in water at a relevant pH (e.g., between about 5.5 and about 8.5, such as 7.0) and a relevant temperature (e.g., of from about 20° C. to 30° C., such as about 25° C.). In the flask method, the test substance is first pulverized by grinding and weighed into a vessel, such that approximately 5× the quantity determined by a preliminary test is weighed into a vessel and then the indicated amount of water is added to the vessel (e.g., 1 L). When saturation is achieved, the mixture is cooled to the test temperature and stirring is performed until equilibrium is reached. The mass concentration of the test substance dissolved in the aqueous solution (it must not contain undissolved particles) can be determined analytically by any useful methodology (e.g., gas or liquid chromatography, titration, photometry, and/or voltammetry). Gas chromatography is preferred. In the column elution method, a micro-column including an excess of the test substance with an inert carrier (e.g., beads, silica, sand, etc.), is eluted with water and the mass concentration of the substance in the eluate is determined when the concentration of the eluate is constant. This method is based on the elution of the test substance with water at constant temperature from a column charged with the substance which is finely distributed on an inert support material. The flow rate of the water should be adjusted so that a saturated solution leaves the column. Saturation is achieved when, in consecutive fractions of the eluate at different flow rates, the mass concentration—determined by a suitable method—is constant. This is shown by a plateau when the concentration is plotted against time or eluted volume. As noted above, the mass concentration of the test substance dissolved in the aqueous solution can be determined analytically by any useful methodology (e.g., gas or liquid chromatography, titration, photometry, and/or voltammetry). Gas chromatography is preferred.

Further details for determining solubility include those in, e.g., Organisation for Economic Cooperation and Development (OECD), "Test No. 105: Water solubility," OECD Guideline for the Testing of Chemicals, adopted Jul. 27, 1995 (7 pp.); OECD-Environment Directorate: Joint Meeting of the Chemicals Committee and the Working Party on Chemicals, Pesticides and Biotechnology, "Guidance document on transformation/dissolution of metals and metal compounds in aqueous media," OECD Series on Testing and Assessment, Number 29, Jul. 23, 2001 (19 pp.); "Council Regulation (EC) No. 440/2008 of 30 May 2008 laying down test methods pursuant to Regulation (EC) No 1907/2006 of the European Parliament and of the Council on the Registration, Evaluation, Authorisation and Restriction of Chemicals (REACH)," Official J. European Union L142, Part. A.6 (p. 57-66), May 31, 2008, (739 pp.); U.S. Environmental Protection Agency, "Product Properties Test Guidelines—OPPTS 830.7860 Water Solubility (Generator Column Method)," EPA 712-C-96-042, August 1996 (19 pp.); and U.S. Environmental Protection Agency, "Product Properties Test Guidelines—OPPTS 830.7840, Water Solubility: Column Elution Method; Shake Flask Method," EPA 712-C-98-041, March 1998 (14 pp.), each of which is incorporated herein by reference in its entirety.

In one embodiment, the composite, water-responsive safety layer and/or composite water- and pH-responsive safety layer comprises a polymer but is substantially free of (added) metal salt. In this regard, the metal materials of the negative pole may be oxidized and thereby provide a source of ions capable of serving as a sacrificial substance for dendrite growth. Thus, in another embodiment, the disclosure provides a battery comprising a housing, the housing comprising first and second poles; and a composite water-responsive safety layer comprising a polymer material and being positioned adjacent to at least one of the first and second poles, the composite water-responsive safety layer being adapted to change from a non-electronically conducting state to an electronically conducting state when contacted with an aqueous solution.

In embodiments, the composite water- and pH-responsive safety layer comprises a non-metal salt. Specific non-metal salts include but are not limited to ammonium carbonate ($(NH_4)_2CO_3$) and ammonium chloride ($NH_4Cl$).

The composite, water-responsive safety layer and/or composite water- and pH-responsive safety layer may optionally further comprise a reducing agent. As used herein, the term “reducing agent” generally refers to organic reducing agents, inorganic reducing agents, or particles of a metallic element or a metal alloy in its fully reduced state. The reducing agent is capable of reducing soluble metal ions to conductive elemental metal without application of a cell potential even at locations far from the negative electrode (that is, electro-less deposition of metal occurs). The electro-less deposition of metal can help create bridging dendrite sections as they grow in the composite water-responsive safety film, so as to establish an electronic connection between the battery poles and thereby facilitate shorting of the cell. Thus, in one embodiment, a composite water-responsive safety layer may include a polymer material and a metal powder, such as zinc powder, and a powdered metal salt, such as copper sulfate, included therein. In a dry state, the reaction between zinc and copper sulfate is prevented and the safety layer is non-conducting. Upon exposure to aqueous environments, as in accidental ingestion, the copper can dissolve to produce copper ions that can be reduced by the zinc metal to produce copper dendrites that can grow and connect to adjacent dendrites to produce a conductive pathway that spans the gap between the battery poles, thereby shorting the cell. Reducing agents including but not limited to ascorbic acid or ascorbate salts, tocopherols, sodium borohydride, aluminum(0) (Al), calcium(0) (Ca), iron(0) (Fe), magnesium(0) (Mg), nickel(0) (Ni), tin(0) (Sn), titanium(0) (Ti), zinc(0) (Zn), as well as alloys and combinations thereof may be used.

The composite, water-responsive safety layer and/or composite water- and pH-responsive safety layer may optionally further comprise a metal powder. As used herein, the term “metal powder” generally refers to particles of a metallic element or a metal alloy in its fully reduced state. The metal particles may have a particle diameter of between about 0.1 μm and about 500 μm, for example, between about 0.50 μm and about 100 μm, and/or between about 1 μm and about 50 μm. The metal powder can remain in its reduced form in the water-responsive safety layer and/or water- and pH-responsive safety layer and help bridge dendrite sections as they grow therein, so as to establish an electronic connection between the battery poles and thereby facilitate shorting of the cell. Elemental metal powders including but not limited to bismuth(0) (Bi), copper(0) (Cu), iron(0) (Fe), indium(0) (In), lead(0) (Pb), magnesium(0) (Mg), mercury(0) (Hg), nickel(0) (Ni), silver(0) (Ag), tin(0) (Sn), zinc(0) (Zn), as well as alloys and combinations thereof may be used. Additionally, the metal powder can be oxidized by the positive pole, thereby providing a source of ions capable of serving as a sacrificial substance for dendrite growth. The metal powder can also serve as a bridge and as a sacrificial substance for dendrite growth simultaneously. Thus, in yet another embodiment, a composite water-responsive safety layer may include a polymer material as described above and a metal powder, with substantially no metal salt included therein.

The composite water-responsive safety layers may include one or more polymers, one or more metal salts, and optionally one or more metal powders. Any combination of metal salts and metal powders may be included in combination with one or more polymers to produce a composite water-responsive safety film. Any of the metal salt, polymer, and optional metal powder may be processed by a variety of methods including but not limited to ball milling to reduce particle size. The combination of the metal salt, polymer, and optional metal powder may be deposited to provide a safety polymer layer comprising the metal salt, polymer, and optional metal powder.

Typically, the combination of polymers, one or more metal salts, and optional metal powder(s) may include a solvent to facilitate processing. Generally, the solvent need not be limited. Suitable solvents include but are not limited to aliphatic solvents, aromatic solvents, and isoparaffin solvents. Specific examples include but are not limited to acetone, ethyl acetate, toluene, xylenes, terpineol, n-methyl-2-pyrrolidone, hexanes, pentanes, and diglyme. The utilization of a solvent allows solvent casting methods such as spin casting to be used to provide the composite water-responsive safety layer. Additionally, solvent utilization allows inkjet printing deposition and various known spraying methods to be used to deposit the composite water-responsive safety layer. Other deposition methods including but not limited to direct ink writing (in which the composition is extruded from a nozzle and directly applied to the battery as described herein) and contact printing techniques such as flexographic printing, gravure printing, and pad printing may also be used. In addition, transfer printing, a technique in which a composition for forming the composite, water-responsive safety layer and/or composite water- and pH-responsive safety layer is deposited on a substrate or backing and dried such that the composite water-responsive safety layer can be removed and directly applied to a battery surface (analogous to application of a sticker) may also be used. The same solvents and methods can be used to provide a composite water- and pH-responsive safety layer.

The battery surfaces may be activated by any suitable surface activation technique, for example, plasma treatments including but not limited to argon or corona treatments, UV/ozone treatments, flame treatments, chemical treatments including but not limited to acid treatments, base treatments, and the like. Such treatment prior to deposition may increase adhesion of the composite water-responsive safety layer and/or composite water- and pH-responsive safety layer to the battery surfaces. Adhesion promoters, especially silane adhesions promoters have been found to enhance adhesion of the composite water-responsive safety layer and/or composite water- and pH-responsive safety layer to the battery surfaces, especially after the surfaces have been activated using a UV/ozone treatment. Representative adhesion promoters include but are not limited to Di-Alkoxy Silanes such as Diethoxydimethylsilane; Diethoxy(methyl)vinylsilane; 1,3-Diethoxy-1,1,3,3-tetramethyldisiloxane; Dimethoxydimethylsilane; Dimethoxydimethylsilane; Dimethoxymethylvinylsilane; and Methyldiethoxysilane; Mono-Alkoxy Silanes such as Ethoxytrimethylsilane and Methoxytrimethylsilane; Tri-Alkoxy Silanes such as 3-Aminopropyl)triethoxysilane ("APTES"); (Chloromethyl)triethoxysilane; Triethoxy(ethyl)silane; Triethoxymethylsilane; Triethoxymethylsilane; Triethoxyvinylsilane; Trimethoxymethylsilane; Trimethoxymethylsilane; Vinyltrimethoxysilane; and Vinyltrimethoxysilane; Trihalosilanes such as tert-Butyltrichlorosilane; Di-n-octyldichlorosilane; Hexachlorodisilane; Methyltrichlorosilane; Methyltrichlorosilane; Trichloro(dichloromethyl)silane; Trichlorovinylsilane; Bis-Silanes such as 1,2-Bis(triethoxysilyl)ethane; 1,2-Bis(trimethoxysilyl)ethane; 1,2-Bis(trichlorosilyl)ethane; and Bis(trichlorosilyl)methane; and combinations thereof.

The composite water-responsive safety layer and/or composite water- and pH-responsive safety layer may further comprise an additive such as a stabilizer, a porogen, and/or a pigment. The stabilizer may be used to maintain the rheology of the composition such that it does not settle quickly. Exemplary stabilizers include dispersants such as polyurethane- and polyacrylic-based dispersants available under the Efka® PU and Efka® PA trade names, respectively (BASF Corporation), fumed metal oxide rheology additives including but not limited to those fumed silica and fumed alumina rheology additives available under the Aerosil® (Evonik) and CAB-O-SIL® trade names (Cabot Corporation), and chelating agents such as sodium ethylenediaminetetraacetic acid. Of course, other metal oxide rheology additives may also be used. The porogen may be used to facilitate wetting and promote adhesion. Exemplary porogens include but are not limited to ammonium chloride, ammonium carbonate, citric acid, water-soluble saccharides (e.g., glucose, sucrose, fructose, etc.), polyethylene glycol, sodium chloride, and sodium acetate. The pigment may be used to provide desired aesthetic effects and may be selected from pigments, dyes, and combinations thereof.

The polymer material may be present in an amount between 5 wt. % and 90 wt. %, for example between 10 wt. % and 85 wt. %, based on the weight of the composite water-responsive safety layer and/or composite water- and pH-responsive safety layer. The metal salt may be present in an amount between 5 wt. % and 95 wt. %, for example between 10 wt. % and 90 wt. %, based on the weight of the composite water-responsive safety layer. Similarly, the non-metal salt may be present in an amount between 5 wt. % and 95 wt. %, for example between 10 wt. % and 90 wt. %, based on the weight of the composite water- and pH-responsive safety layer. The metal powder, when present, may be present in an amount between 5 wt. % and 95 wt. %, for example between 10 wt. % and 90 wt. %, based on the weight of the composite water-responsive safety layer and/or composite water- and pH-responsive safety layer. The adhesion promoter, when present, may be present in an amount between 0.1 wt. % and 5 wt. %, for example between 0.25 wt. % and 2.0 wt. %, based on the weight of the composite water-responsive safety layer and/or composite water- and pH-responsive safety layer. The rheology additive, when present, may be present in an amount between 0.1 wt. % and 7.5 wt. %, for example between 0.25 wt. % and 5.0 wt. %, based on the weight of the composite water-responsive safety layer and/or composite water- and pH-responsive safety layer. The colorant, when present, may be present in an amount between 1 wt. % and 35 wt. %, for example between 2.5 wt. % and 30 wt. %, based on the weight of the composite water-responsive safety layer and/or composite water- and pH-responsive safety layer.

The composite water-responsive safety layer and/or composite water- and pH-responsive safety layer is disposed above the gap between the positive and negative poles and typically has a thickness between 30 μm and 1000 μm, for example between 30 μm and 100 μm, between 50 μm and 200 μm, between 100 μm and 300 μm, between 50 μm and 500 μm, and/or between 100 μm and 1000 μm. Typically, the composite water-responsive safety layer and/or composite water- and pH-responsive safety layer covers at least about 10%, at least about 20%, at least about 30%, at least about 40%, at least about 50%, at least about 60%, at least about 70%, at least about 80%, at least about 90%, or substantially 100% of the circumference defined between the anode cup and the cathode can. Typically, the composite water-responsive layer and/or composite water- and pH-responsive safety layer contacts both a portion of the anode cup and a portion of the cathode can, but generally contact with only one of the battery poles is sufficient, as described in further detail below. In embodiments, the composite water-responsive layer and/or composite water- and pH-responsive safety layer has a width between 200 μm and 2000 μm (corresponding to the gap between the positive and negative poles in a coin cell).

Figure 2A:
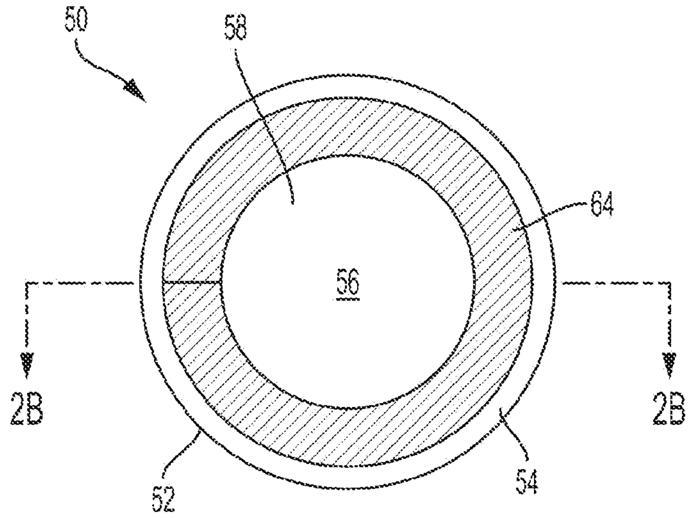
FIGS. 2A and 2B illustrate an example battery, in the form of a coin cell, having a composite water-responsive safety layer adapted to change from a non-electronically conducting state to an electronically conducting state when contacted with an aqueous solution.
Figure 2B:
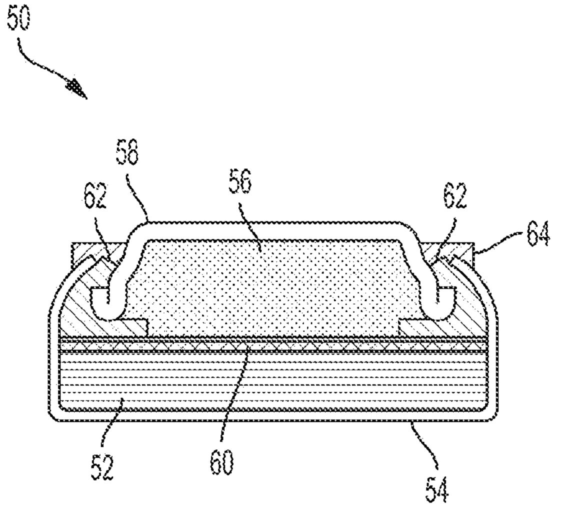

FIGS. 2A and 2B illustrate a battery 50, which may be any type of primary or secondary battery and which is a button cell type battery in the illustrated example. The battery 50 includes a battery housing surrounding the battery, the housing comprising a cathode can 54 and an anode cup 58, the cathode can 54 enclosing a cathode 52 within the housing and the anode cup 58 enclosing an anode 56 within the housing, the cathode 52 and the anode 56 being separated electronically by a separator 60 within the cell 50. Each of the cathode can 54 and the anode cup 58 forms a different pole of the battery 50.

The cathode can 54 and the anode cup 58 are spaced apart by a separator 60 extending across the lateral extent of the cathode 52, e.g., substantially across a diameter of the battery 50. Electronically isolating the can 54 and the cup 58, an insulating gasket 62 extends into the cathode can 54 providing an insulating buffer surrounding the anode cup 58 that also seals the cell to prevent electrolyte loss.

As illustrated, the battery 50 further includes a composite water-responsive safety layer 64 surrounding at least a portion of the insulating gasket 62, the composite water-responsive safety layer 64 contacting both a portion of the anode cup 58 and a portion of the cathode can 54. The composite water-responsive safety layer 64 is an electronic shorting layer that changes from a non-electronically conducting state, which corresponds to normal operation conditions of the battery cell 10, to an electronically conducting state, which is caused by exposing the cell to a safety condition, typically, saliva, stomach fluids, or other aqueous fluids. For example, a safety condition can be when a person or infant swallows the battery cell 50, exposing the battery cell 50 to an aqueous solution in the form of saliva, stomach fluids, or other aqueous fluid. As discussed further herein, the composite water-responsive safety layer 64 changes states from the non-electronically conducting state to the electronically conducting state when contacted with an aqueous solution, e.g., in response to contact with an aqueous solution such as saliva or stomach fluids, water, or other aqueous fluid.

In a representative example, the composite water-responsive safety layer 64 is formed by combining polyethylene glycol (PEG), about 10% by weight of zinc (Zn) particles (~20 mesh size) and about 10% by weight of copper sulfate ($CuSO_4$) particles in a glass vial on a stir plate held at about 50° C. and then depositing the composition on or about at least a portion of the insulating gasket 62. By covering at least a portion of the insulating gasket 62 with the composition comprising an oxidized metal component, a sacrificial substance capable of being reduced is advantageously provided at the negative pole such that a dendritic metallic structure can grow to electronically connect the anode to the cathode under a safety condition, for example, when a person or infant swallows the battery cell 50, so as to expose the battery cell 50 to an aqueous solution in the form of saliva, stomach fluids, or other fluid, thereby strategically causing the button cell to short without significant electrolysis of water and accompanying generation of hydroxide ions and burning of tissues. While the composite water-responsive layer is shown as contacting both a portion of the anode cup 58 and a portion of the cathode can 54, generally contact with only one of the battery poles is sufficient, for example, because the device can provide a contact pad helping to establish electronic contact between the dendrites of the composite water-responsive layer and the other battery pole.

Figure 3:
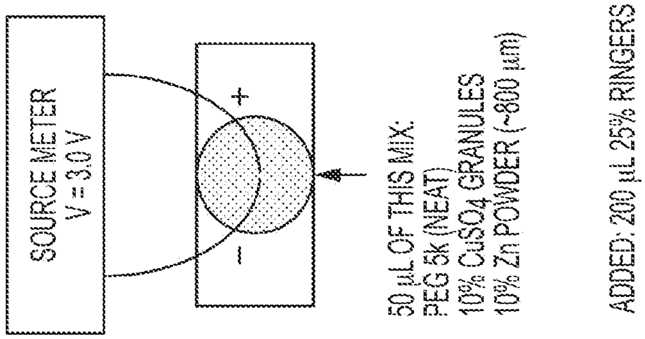
FIG. 3 is a schematic of a prototype battery configuration, where the composite water-responsive safety layer comprises a polymer matrix comprising polyethylene glycol (PEG), a metal salt and a metal powder, in accordance with an example.

To assess polymer matrices for use in the composite water-responsive safety layers according to the disclosure, a two wire lead test was performed, as shown in FIG. 3. A sample of 50 μl of a sample material composition was deposited between two zinc wires (approximately 200 μm apart). The composition will differ depending on materials being tested. In the illustrated example, the composition comprised a polymer matrix comprising polyethylene glycol (PEG), 10% by weight of zinc particles (Zn powder) and 10% by weight of copper sulfate, $CuSO_4$, particles. To simulate a CR2032 button cell lithium battery rated at 3.0 volts, the voltage source to the two zinc wires was set to 3 V and current compliance was set for 30 mA (the maximum current of a CR2032 battery). A 200 μL aliquot of a saliva surrogate solution (specifically, 25% Ringers solution) was deposited onto the polymer matrix. The potential was monitored for up to 1 hour.

Figure 4:
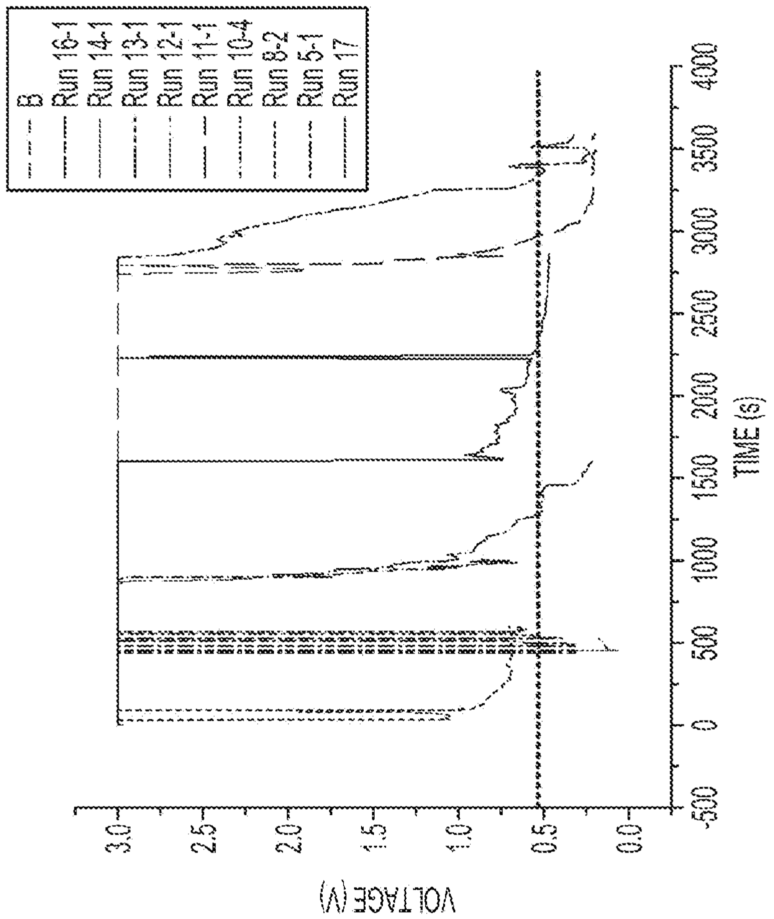
FIG. 4 is a plot of changes in voltage over time for different tests using the prototype battery configuration of FIG. 3, with the composite water-responsive safety layer exposed to an aqueous solution, in accordance with an example.

The results from several repeated tests for different CR2032 batteries each having a composite water-responsive safety layer are shown in FIG. 4. Each test was performed at a different starting time, but each demonstrates that the anode and cathode short out and reduce the effective battery voltage from 3 V to <1 V in as little as 90 seconds.

Figure 5:
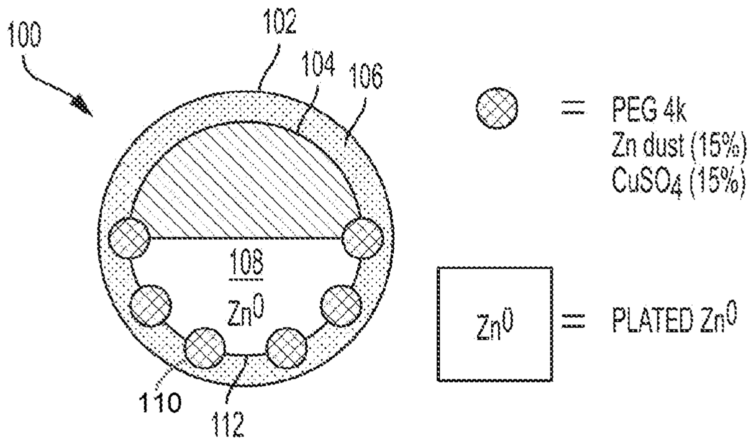
FIG. 5 illustrates an example battery, in the form of a button cell, having a composite water-responsive safety layer deposited at specific locations between the negative pole and positive pole of the battery, in accordance with an example.

FIG. 5 illustrates another example battery cell 100 with cathode can 102, anode cup 104, and polymer layer 106. To assist in suppressing the generation of hydrogen bubbling during metal dendrite growth, which can hinder successful metal dendrite growth when the cell is exposed to an aqueous solution, the composite water-responsive safety layer 106 was formed after initially plating the exposed anode cup 104 with a Zn layer 108, for example, by plating a dot of zinc metal on the anode cup 104 and thereafter depositing there over a composition containing one or more polymer materials and one or more metal salts, optionally in further combination with one or more metal powders, as disclosed herein. The Zn layer 108 locally increases the hydrogen overvoltage and thereby advantageously suppresses hydrogen bubbling at the specific location(s) where a zinc layer was deposited. Other metal layers having reasonably high overvoltage of hydrogen evolution (in comparison with hydrogen overvoltage of material of negative electrode, typically Ni or stainless steel), including tin (Sn), indium (In), bismuth (Bi), lead (Pb), zinc (Zn) and mercury (Hg), can alternatively be used alone or in combination to suppress hydrogen bubbling and promote formation of a metallic dendrite short connection between the cathode can 102 and the anode cup 104.

A composition containing acetone and dissolved or suspended polyethylene glycol (having a weight average molecular weight of 4000 g/mol), copper sulfate powder (15% by weight of the dissolved or suspended solids in the slurry), and zinc metal dust (15% by weight of the dissolved or suspended solids in the slurry) was heated to ~50° C. on a hotplate and mixed thoroughly with a Teflon-coated magnetic stir bar. A sample of this composition (15 μL) was pipetted into locations around a clip edge 112 of half of the battery 100 having a Zn layer 108.

Thus, the composite water-responsive safety layer 106 may be formed as a substantially continuous layer around the anode cup 104 battery surface, in particular such that the composite water-responsive safety layer is disposed along and preferably in contact with a periphery of the anode cup 104 and along and preferably in contact with a periphery of the cathode can 102 or more generally may be disposed between the first and second (e.g., positive and negative) battery poles as shown via the top portion of battery cell 100. In other examples as illustrated via the bottom portion of battery cell 100, the composite water-responsive safety layer 106 need not be continuous, but rather may be periodically positioned (e.g., deposited, layered, etc.), for example deposited as discrete dots 110 such as is illustrated in FIG. 5.

Figure 6:
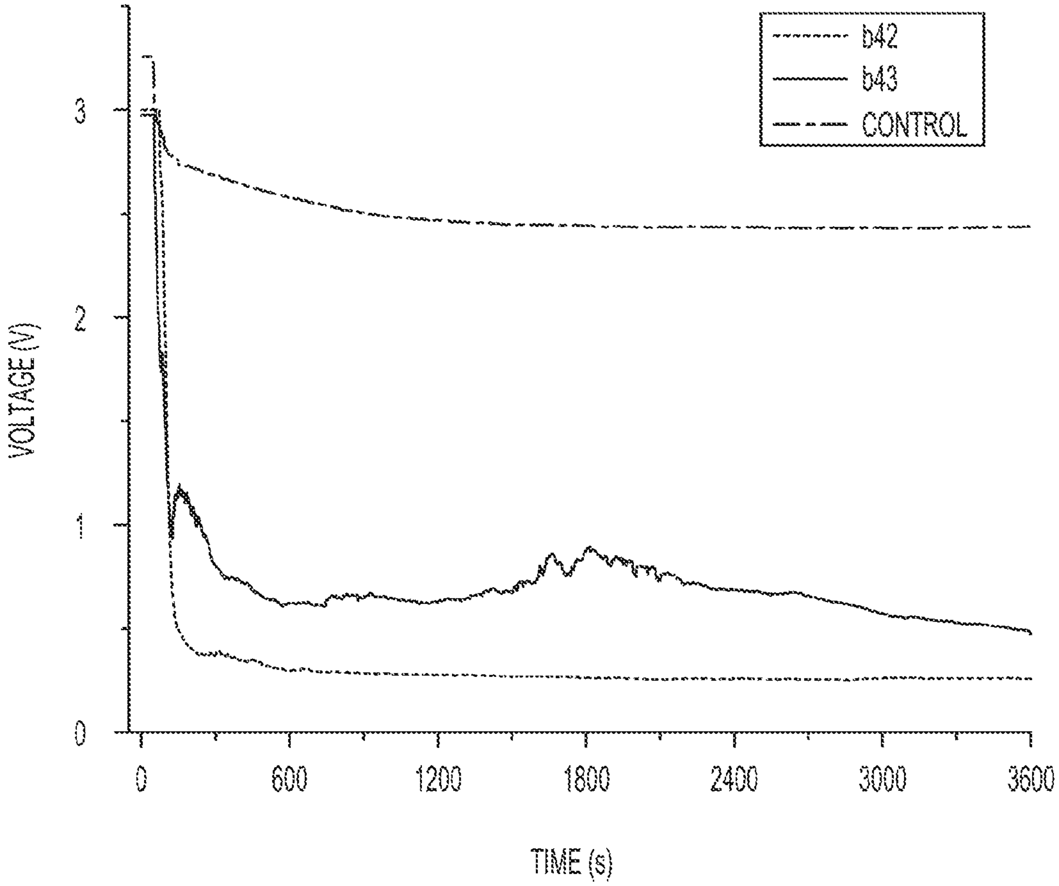
FIG. 6 is a plot of changes in voltage over time for different tests on the battery configuration of FIG. 5, with the composite water-responsive safety layer exposed to an aqueous solution, in accordance with an example.

Direct measurements of the voltage across the battery 100, when the battery was immersed in 25% Ringers aqueous solution, were used to confirm external battery cell shorting. Results indicated that a metal dendrite grew such that cell shorting developed and assisted to reduce the voltage of the battery cell 100 to non-threatening values below 1 V as shown in FIG. 6.

Figure 7:
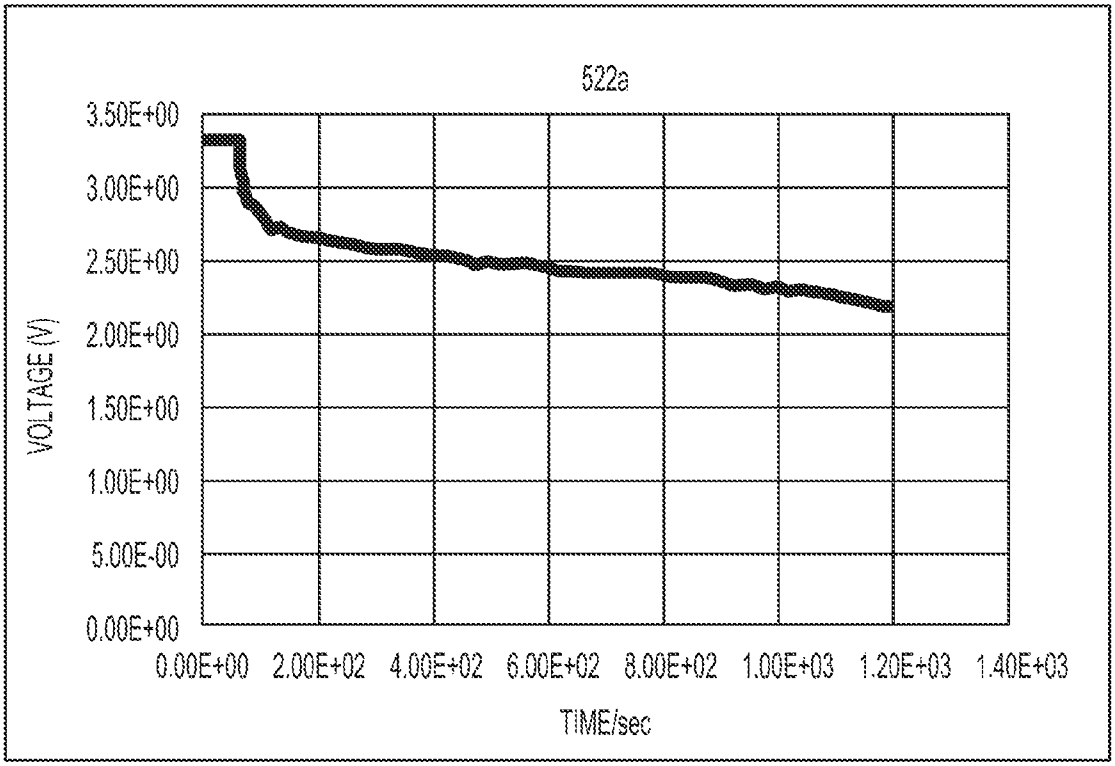
FIG. 7 shows a graph illustrating the time needed for an example battery cell with a composite water-responsive safety layer to short when exposed to an aqueous solution.

In the example illustrated in FIG. 7, the composite water-responsive safety layer comprises about 12.5% by weight polyvinyl acetate (PVAc), about 4.16% by weight polyethylene oxide (PEO), about 8.33% by weight of copper sulfate particles ($CuSO_4$) and about 75% by weight of basic copper carbonate particles ($CuCO_3 \cdot Cu(OH)_2$ which is also known as malachite). Advantageously, as shown in FIG. 7, the voltage of the cell drops very quickly and efficiently upon contact with an aqueous solution. While the voltage drop is only shown over 20 minutes, the voltage will drop lower as time goes on. In addition, cells having composite water-responsive safety layers comprising the foregoing mixture demonstrated no change in cell voltage even after exposure to 90% relative humidity for at least two hours.

Figure 8:
FIG. 8 shows a graph illustrating the time needed for another example battery cell with a composite water-responsive safety layer to short when exposed to an aqueous solution.

In the example illustrated in FIG. 8, the composite water-responsive safety layer comprises about 16.75% by weight polyvinyl acetate (PVAc), about 6.25% by weight polyethylene oxide (PEO), about 12.5% by weight of copper sulfate particles ($CuSO_4$) and about 62.5% by weight of basic copper carbonate particles ($CuCO_3 \cdot Cu(OH)_2$). Advantageously, as shown in FIG. 8, the voltage of the cell drops very quickly and efficiently upon contact with an aqueous solution. While the voltage drop is only shown over 20 minutes in FIG. 8, the voltage dropped lower as time goes on. Consistent therewith, as seen in the following table, after 2 hours, the voltage of cells comprising the foregoing safety layer were well under 1.2V and the pH was relatively neutral and thus not capable of causing tissue to burn.

TABLE 1

| Cell | 2 h V | pH |
|---|---|---|
| 522b2 | 0.329 | 6 |
| 522b3 | 0.438 | 6 |

TABLE 1-continued

| Cell | 2 h V | pH |
|---|---|---|
| 522b4 | 0.567 | 7 |
| 522b5 | 0.428 | 6 |
| 522b6 | 0.697 | 6 |
| 522b7 | 0.539 | 6 |
| 522b8 | 0.426 | 6 |
| 522b9 | 0.499 | 6 |
| 522b10 | 0.513 | 6 |

In addition, cells having composite water-responsive safety layers comprising the foregoing mixture demonstrated no change in cell voltage even after exposure to 90% relative humidity for at least two hours.

Figure 9:
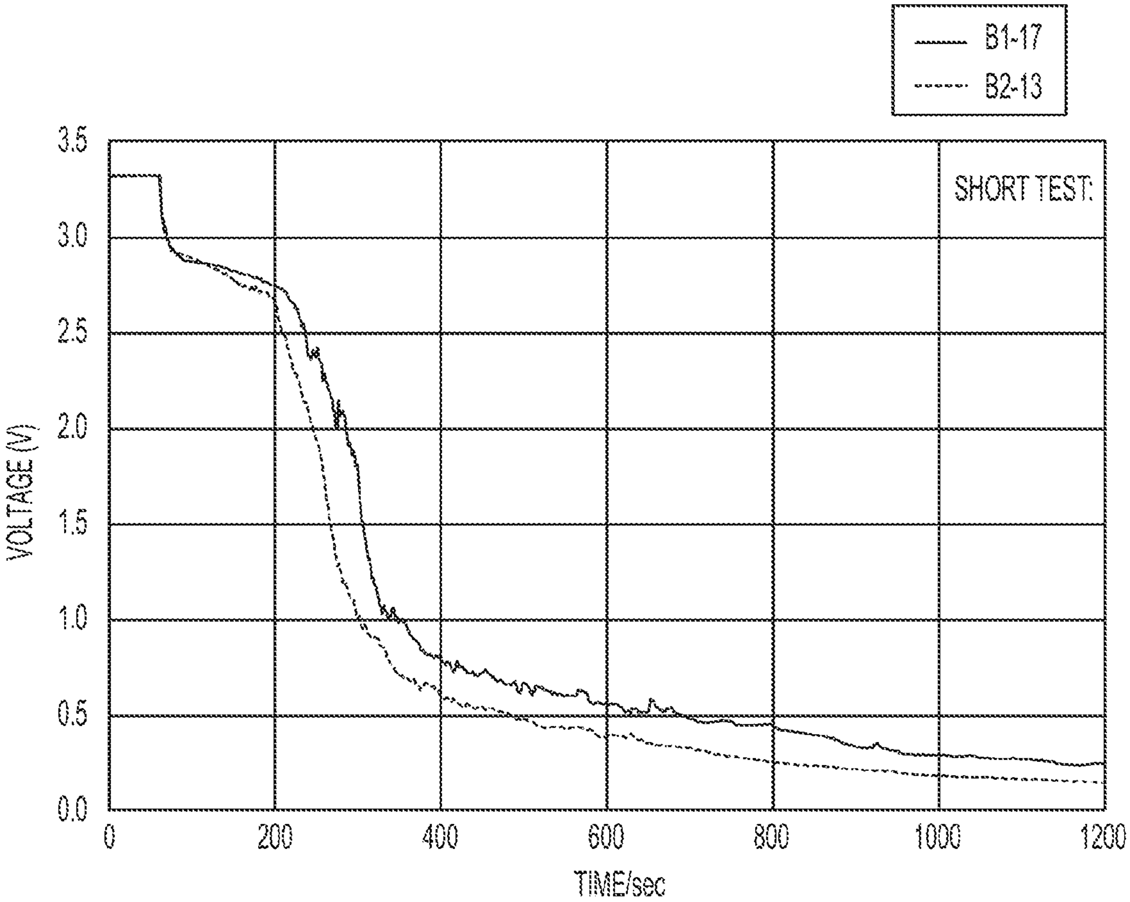
FIG. 9 shows a graph illustrating the time needed for yet another exemplary battery cell with a composite water-responsive safety layer to short when exposed to an aqueous solution.

In the example illustrated in FIG. 9, the composite water-responsive safety layer comprises about 16.67% by weight polyvinyl acetate (PVAc 500K, polyvinyl acetate having a weight average molecular weight of about 500,000), about 41.67% by weight of copper sulfate particles ($CuSO_4$) and about 41.67% by weight of basic copper carbonate particles ($CuCO_3 \cdot Cu(OH)_2$). Generally, about 400 mg of the polyvinyl acetate was dissolved in about 1 mL xylenes and about 1 g ball milled $CuSO_4$ and 1 g ball milled $CuCO_3 \cdot Cu(OH)_2$ were added thereto. The composition was loaded into a syringe and allowed to equilibrate at room temperature before being deposited onto a cell in the gap between the first and second battery poles. Following deposition, the composition was allowed to dry in air (for about 24 hrs). Advantageously, as shown in FIG. 9, the voltage of the cell drops very quickly and efficiently upon contact with an aqueous solution. Indeed, in these cells, the voltage drops below 1.2V in less than 400 seconds.

In another specific example, a composite water-responsive safety layer comprises about 22% by weight PEG 6K (polyethylene glycol having a weight average molecular weight of about 6000), about 2% by weight PMMA 75K (polymethyl methacrylate having a weight average molecular weight of about 75,000), about 38% by weight zinc particles (Zn powder) and about 38% by weight copper sulfate, $CuSO_4$, particles. Generally, the polymeric components were dissolved in acetone and zinc particles and ball milled $CuSO_4$ were added thereto. The viscosity of the formulation was adjusted with terpineol. Using a nozzle tool, the formulation was deposited along and in contact with a periphery of the anode cup and along and in contact with a periphery of the cathode can so as to form the composite water-responsive safety layer in a gap between the first and second battery poles. Xylenes were also used in place of acetone and is preferable for aerosol and microdispensing (e.g., inkjet printing) deposition.

In a further specific example, a composite water-responsive safety layer comprises about 17% by weight PVAc 100K (polyvinyl acetate having a weight average molecular weight of about 100,000), about 41.5% by weight zinc particles (Zn powder) and about 41.5% by weight copper sulfate, $CuSO_4$, particles. Generally, the polymer was dissolved in xylenes at about 60° C. and zinc particles and ball milled $CuSO_4$ were added thereto. The formulation was deposited by aerosol printing using an airbrush. Masking was used to facilitate deposition and thus composite water-responsive safety layer formation in the gap between the first and second battery poles.

In an additional specific example, the composite water-responsive safety layer comprises about 29% by weight PVAc 100K (polyvinyl acetate having a weight average molecular weight of about 100,000) and about 71% by weight copper sulfate, $CuSO_4$, particles. Generally, the polymer was dissolved in xylenes at about 50° C. and ball milled $CuSO_4$ and a colorant, specifically Phthalocyanine Blue BN pigment, were added thereto. The formulation was deposited in the gap between the first and second battery poles by direct writing/extrusion using a nozzle tool.

In yet an additional specific example, a composite water-responsive safety layer was prepared from an ink composition comprising about 1 g PVAc 500K (polyvinyl acetate having a weight average molecular weight of about 500,000), about 2.5 g copper sulfate, $CuSO_4$, particles and about 2.5 g basic copper carbonate particles ($CuCO_3 \cdot Cu(OH)_2$). Generally, the polyvinyl acetate was dissolved in about 5 mL xylenes at about 70° C. and about 50 or about 100 mg of a fumed silica rheology additive, CAB-O-SIL-EH-5, and then ball milled $CuSO_4$ and $CuCO_3 \cdot Cu(OH)_2$ were added to form the ink formulation. The formulations were deposited in the gap between the first and second battery poles by direct write printing using a nozzle having a tip diameter of about 0.41 mm. The formulation with the greater concentration of fumed silica rheology additive demonstrated higher resolution.

Further examples A-D were prepared according to Table 2:

| Component | Ex. A (black) | Ex. B (copper) | Ex. C (green) | Ex. D (black) |
|---|---|---|---|---|
| Polyvinylacetate, 500 kD | ~13.88% | ~14.91% | ~16.11% | ~12.19% |
| Copper sulfate | ~34.69% | ~37.26% | ~40.28% | ~30.46% |
| Basic copper carbonate | ~34.69% | ~37.26% | ~40.28% | ~30.46% |
| Aerosil-200 | ~2.08% | ~2.24% | ~2.42% | ~1.83% |
| APTES | ~0.79% | ~0.89% | ~0.91% | ~0.69% |
| Carbon Black, Pearl EX (Jacquard Products) | ~13.88% | — | — | — |
| Super Copper, Pearl EX (Jacquard Products) | — | ~7.46% | — | — |
| Titan Black (Uniglobe Kisco, Inc.) | — | — | — | ~24.37% |

All reagents can be used as-received without further treatment or purification. To give the formulations desirable rheological and anti-settling properties, however, the basic copper carbonate was first dispersed in a solvent (acetone) and then ball-milled wet (Retsch Mixer Mill MM200, Retsch GmbH) for 2 hours to reduce the particle size to between about 1-30 μm. After filtering the resulting slurry, the solid was placed into a container and dried (air or vacuum). Copper sulfate was ball milled dry for 30 min. Copper sulfate and (3-aminopropyl)triethoxysilane were stored in a desiccator until use.

In a 20 mL glass vial with a Teflon-coated magnetic micro-stir bar, 200 mg of PVAc (500 kD) was dissolved in 2 mL of toluene with continuous stirring on a magnetic stir-plate for each of the examples A-D. When the PVAc was completely dissolved (up to 1 h), the basic copper carbonate (500 mg), copper sulfate (500 mg), colorant (200 mg Carbon Black, 100 mg Super Copper, 400 mg Titan Black, in Examples A, B, and D, respectively, with Example C not including any additional pigment), and Aerosil-200 (30 mg) were added and mixed for 5-10 min to produce a uniformly dispersed slurry. Upon storage in a desiccator or other moisture-free environment, the mixture demonstrated stability for at least one week. If settling occurs vigorous stirring/mixing is sufficient to redisperse the solid components in the mixture.

Surfaces were cleaned and activated to enhance adhesion. As-received cells were cleaned and activated using a UV/ozone treatment for several minutes. Sufficient activation was confirmed when a drop of deionized water easily wets an activated surface and has a contact angle of less than 10 degrees. Activated surfaces were coated as soon as possible after activation (within an hour for best results) with formulations that were mixed to resuspend all the components (5-10 min). APTES was added to (otherwise complete) formulations shortly before deposition and the formulations were stirred for another 5 min. Typical deposition volumes are between 10-15 μL and not more than 20 μL. The formulations were deposited either by hand or by extrusion using a nozzle tool in the gap between the first and second battery poles.

Measurements conducted using a rheometer showed coatings were a gel at low shear (>1,000,000 Pa·s at shear rate of 0.001 $s^{-1}$) and a viscous liquid at high shear (1,000 Pa·s at shear rate of 100 $s^{-1}$).

Batteries with a composite safety film according to Example A were assessed for passivation performance and humidity tolerance at 70% relative humidity (40° C.). The composite water-responsive safety films advantageously demonstrated no change in cell voltage even after exposure to 70% relative humidity for greater than 16 days. Further, the voltage of the cells dropped upon contact with an aqueous solution such that, after 2 hours, the voltage of cells comprising the foregoing safety layer were well under 1.2V, and indeed less than 0.1V, and the pH was neutral and thus not capable of causing tissue to burn.

Throughout this specification, plural instances may implement components or structures described as a single instance. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, an element A or B is satisfied by any one of the following: A is present and B is not present, A is not present and B is present, and both A and B are present.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed:

1. A battery comprising:

a housing, the housing comprising first and second poles; and a composite water-responsive safety layer comprising a polymer material and being positioned adjacent to at least one of the first and second poles, the composite water-responsive safety layer being adapted to short the battery to below 1.5V when contacted with an aqueous solution, the composite water-responsive safety layer further comprising at least one metal salt, wherein the composite water-responsive safety layer is disposed on an external surface of the battery.

2. The battery of claim 1, wherein the polymer material comprises one or more polymer materials chosen from one or more in the group of polyethylene glycols, polyethylene oxides, polyacrylic acids, polyacrylates, polyvinyl alcohols and modified polyvinyl alcohols, water-soluble acrylate copolymers, polyvinyl esters, polyvinyl pyrrolidones, pullulan, gelatin, hydroxylpropylmethyl celluloses (HPMC), low viscosity grade hydroxypropylcelluloses, polysaccharides, water-soluble natural polymers, modified starches, and copolymers of the foregoing.

3. The battery of claim 1, wherein the polymer material is biologically inert.

4. The battery of claim 1, wherein the composite water-responsive safety layer further comprises a zero oxidation state metal powder.

5. The battery of claim 4, wherein the metal powder comprises one or more metal powders chosen from the group of bismuth(0) (Bi), copper(0) (Cu), iron(0) (Fe), indium(0) (In), lead(0) (Pb), nickel(0) (Ni), magnesium(0) (Mg), mercury(0) (Hg), silver (0) (Ag), tin(0) (Sn), zinc(0) (Zn), and alloys thereof.

6. The battery of claim 1, further comprising a metal layer in contact with an exterior surface of the at least one pole.

7. The battery of claim 1, wherein the metal layer is in contact with the negative pole (corresponding to the battery anode) and comprises a metal selected from the group consisting of bismuth(0) (Bi), indium(0) (In), lead(0) (Pb), mercury(0) (Hg), tin(0) (Sn), zinc(0) (Zn), alloys thereof, and any combinations thereof.

8. The battery of claim 1, wherein the composite water-responsive safety layer comprises one or more polymers chosen from polyethylene glycol (PEG), polyvinyl acetate (PVAc), polyethylene oxide (PEO), and polymethyl methacrylate (PMMA), and the metal salt comprises copper sulfate ($CuSO_4$).

9. The battery of claim 8, wherein the composite water-responsive safety layer further comprises zinc (Zn) particles.

10. The battery of claim 8, wherein the copper sulfate is present in an amount of at least 5 weight %, based on the total weight of the composite water-responsive safety layer.

11. The battery of claim 1, the composite water-responsive safety layer further comprises an additive chosen from one or more in the group of a stabilizer and a porogen.

12. The battery of claim 1, wherein the positive pole is electronically isolated from the negative pole by an insulating gasket and wherein the composite water-responsive safety layer is positioned adjacent the insulating gasket, the composite water-responsive safety layer extending between and contacting both the positive pole (corresponding to the battery cathode) and the negative pole (corresponding to the battery anode).

13. The battery of claim 12, wherein the composite water-responsive safety layer extends between the positive pole and the negative pole continuously around a periphery of at least one of the positive pole and the negative pole.

14. He battery of claim 12, wherein the composite water-responsive safety layer extends between the positive pole and the negative pole around a portion of a periphery of at least one of the positive pole and the negative pole.

15. The battery of claim 1, wherein the battery is selected from a AAAA, AAA battery, a AA battery, a B battery, a C battery, a D battery, a 9V battery, a CR2 battery, a CR123A battery, a 1/3N battery, a button cell, and a coin cell.

16. The battery of claim 1, wherein the composite water-responsive safety layer further comprises a second metal salt.

17. The battery of claim 1, wherein the second metal salt is water insoluble and the first metal salt is water-soluble.

18. A method comprising:

providing a battery housing comprising first and second poles;

forming a composite water-responsive safety layer between the first and second poles of the battery housing by depositing a composition between the poles such that the composition is adjacent to at least one of the first and second poles, the composition comprising a polymer material and at least one metal salt, the composite water-responsive safety layer being adapted to short the battery to below 1.5V when contacted with an aqueous solution, wherein the composite water-responsive safety layer is disposed on an external surface of the battery.

19. The method of claim 18, wherein the polymer material is chosen from one or more in the group of polyethylene glycols, polyethylene oxides, polyacrylic acids, polyacrylates, polyvinyl alcohols and modified polyvinyl alcohols, water-soluble acrylate copolymers, polyvinyl esters, polyvinyl pyrrolidones, pullulan, gelatin, hydroxylpropylmethyl celluloses (HPMC), low viscosity grade hydroxypropylcelluloses, polysaccharides, water-soluble natural polymers, modified starches, and copolymers of the foregoing.

20. The method of claim 18, further comprising depositing at least one dot of zinc metal on the negative pole prior to depositing the composition.

* * * * *